United States Patent
Katayama et al.

(10) Patent No.: US 12,485,990 B2
(45) Date of Patent: Dec. 2, 2025

(54) DRIVER ASSISTANCE SYSTEM

(71) Applicant: HONDA MOTOR CO., LTD., Tokyo (JP)

(72) Inventors: Makoto Katayama, Saitama (JP); Hiroki Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 283 days.

(21) Appl. No.: 18/186,215

(22) Filed: Mar. 20, 2023

(65) Prior Publication Data

US 2023/0312043 A1    Oct. 5, 2023

(30) Foreign Application Priority Data

Mar. 29, 2022 (JP) ................. 2022-053282

(51) Int. Cl.
*B62J 45/00* (2020.01)
*B62J 50/22* (2020.01)

(52) U.S. Cl.
CPC .............. *B62J 45/00* (2020.02); *B62J 50/22* (2020.02)

(58) Field of Classification Search
CPC ..... B62J 45/00; B62J 50/22; B60K 2310/244; B60W 30/146; B60W 2050/146; B60W 2300/36; B60W 2520/10; B60W 2540/10; B60W 2540/106; B60W 2540/215; B60W 2555/60; B60W 2720/10; B60W 30/143; B60W 50/14; B60Y 2200/12

See application file for complete search history.

(56) References Cited

U.S. PATENT DOCUMENTS

| | | | | |
|---|---|---|---|---|
| 6,236,929 | B1* | 5/2001 | Sen | F16H 61/21 701/87 |
| 2007/0066443 | A1* | 3/2007 | Matsudaira | F16H 61/0213 477/115 |
| 2009/0171546 | A1* | 7/2009 | Tozuka | B60K 31/04 701/1 |
| 2009/0173562 | A1* | 7/2009 | Namari | F02D 11/105 180/179 |
| 2012/0253628 | A1* | 10/2012 | Maruyama | B60W 50/085 701/93 |

(Continued)

FOREIGN PATENT DOCUMENTS

| | | | |
|---|---|---|---|
| DE | 102019115001 A1 * | 12/2020 | |
| JP | 6273000 B2 | 1/2018 | |

*Primary Examiner* — Dale W Hilgendorf
*Assistant Examiner* — Hana Lee
(74) *Attorney, Agent, or Firm* — CKC & Partners Co., LLC

(57) ABSTRACT

A driver assistance system is provided with an accelerator grip turnably operable by a rider to accelerate or decelerate a vehicle which is a saddle-type vehicle, an accelerator position sensor that detects a turning operation of the accelerator grip, an automated cruise controller that automatically controls a vehicle speed of the vehicle or a following distance on the basis of a set vehicle speed, a road sign recognizer that recognizes a regulation speed stipulated for a road on which the vehicle is traveling, and a vehicle speed specifier that, in response to the accelerator position sensor detecting a turning operation in a predetermined pattern while the automated cruise control based on the set vehicle speed is in progress, changes the set vehicle speed on the basis of a recognition result from the road sign recognizer.

6 Claims, 9 Drawing Sheets

(56) References Cited

U.S. PATENT DOCUMENTS

| | | |
|---|---|---|
| 2017/0080938 A1 | 3/2017 | Ohashi et al. |
| 2017/0144665 A1* | 5/2017 | Ohashi ................ B60W 40/04 |
| 2018/0154975 A1* | 6/2018 | Oshiro .................. F02B 61/02 |
| 2020/0239101 A1* | 7/2020 | Oshiro .................. F02D 11/04 |

* cited by examiner

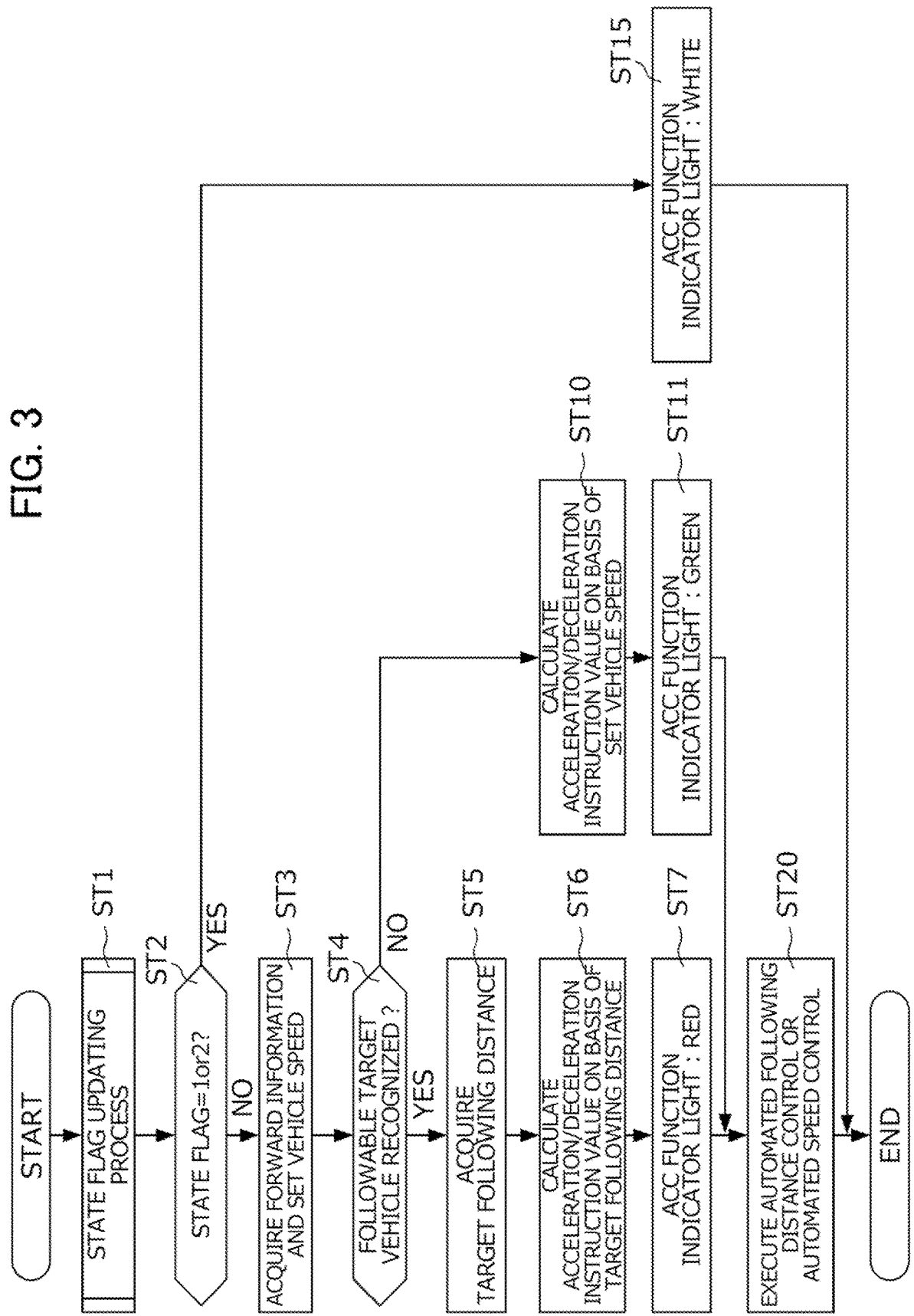

DRIVER ASSISTANCE SYSTEM

This application is based on and claims the benefit of priority from Japanese Patent Application No. 2022-053282, filed on 29 Mar. 2022, the content of which is incorporated herein by reference.

BACKGROUND OF THE INVENTION

Field of the Invention

The present invention relates to a driver assistance system. More specifically, the present invention relates to a driver assistance system for a saddle-type vehicle provided with a function for controlling the vehicle speed automatically on the basis of a set vehicle speed and a function for recognizing a regulation speed that is stipulated for the road on which the vehicle is traveling.

Related Art

Recently, to improve traffic safety, driver assistance functions such as a vehicle following control function (hereinafter, may be denoted by the abbreviation "ACC (Adaptive Cruise Control) function") and a traffic sign recognition function (hereinafter, may be denoted by the abbreviation "TSR (Traffic Sign Recognition) function") are becoming increasingly common in motorcycles.

The ACC function refers to a function for controlling, in a case where a vehicle ahead traveling at a speed less than a preset vehicle speed is recognized successfully, the following distance with respect to the vehicle ahead and a vehicle speed of a vehicle provided with the ACC function so as to cause the vehicle to automatically follow the vehicle ahead. In a case where a vehicle ahead traveling at a speed less than the set vehicle speed is not recognized successfully, the ACC function automatically controls and adjusts a vehicle speed of the vehicle provided with the ACC function to the set vehicle speed in many cases (for example, see Japanese Patent No. 6273000). According to the invention related to a driver assistance system for a motorcycle disclosed in Japanese Patent No. 6273000, in the case of a motorcycle, it is possible to lower the set vehicle speed by operating the front-wheel brake and raise the set vehicle speed by operating the throttle.

The TSR function refers to a function for recognizing road signs stipulated for the road on which the vehicle is traveling and displaying recognized information on a display at suitable timings, thereby prompting the driver to pay attention to the road signs. The TSR function is already implemented in many models of four-wheeled automobiles.

Patent Document 1: Japanese Patent No. 6273000

SUMMARY OF THE INVENTION

Incidentally, in some cases, the legal speed limit stipulated for a road on which a vehicle is traveling may change while the vehicle is traveling according to the ACC function as described above, and the set vehicle speed may exceed the legal speed limit. To address this issue, it is conceivable to cause the ACC function and the TSR function to work in tandem so that the set vehicle speed of the ACC function is changed automatically, with approval by the rider, on the basis of a legal speed limit recognized by the TSR function.

In this case, it is necessary to provide a new switch allowing the rider to perform an approval operation for approving an automatic change of the set vehicle speed based on the recognition result from the TSR function. However, many motorcycles have little available space for providing a new switch. Furthermore, in this case, the rider needs to briefly let go of the accelerator grip in order to perform the approval operation with the left or right hand, which imposes a large burden on the rider.

An objective of the present invention is to provide a driver assistance system for a saddle-type vehicle with which the rider can easily perform an approval operation with respect to a change of the set vehicle speed.

(1) An aspect of the present invention is directed to a driver assistance system (for example, a driver assistance system 1 described later). The driver assistance system is provided with a accelerator grip (for example, a accelerator grip 811 described later) turnably operable by a rider to accelerate or decelerate a vehicle which is a saddle-type vehicle, an accelerator sensor (for example, an accelerator position sensor 812 described later) that detects a turning operation of the accelerator grip, an automated cruise controller (for example, an automated cruise controller 61 described later) that automatically controls a vehicle speed of the vehicle or a following distance on the basis of a set vehicle speed, a regulation speed recognizer (for example, a road sign recognizer 62 described later) that recognizes a regulation speed stipulated for the road on which the vehicle is traveling, and a vehicle speed specifier (for example, a vehicle speed specifier 64 described later) that, in response to the accelerator sensor detecting a turning operation in a predetermined pattern while the automated cruise control based on the set vehicle speed is in progress, changes the set vehicle speed on the basis of a recognition result from the regulation speed recognizer.

(2) In this case, the vehicle speed specifier preferably changes the set vehicle speed on the basis of the recognition result if a turning operation in a predetermined approval pattern is detected by the accelerator sensor, and preferably maintains the set vehicle speed if a turning operation in a predetermined denial pattern is detected by the accelerator sensor.

(3) In this case, the turning operation in the approval pattern preferably is an open/close operation of turning the accelerator grip in an opening direction and then in a closing direction that is performed a first set number of times within a set time period, whereas the turning operation in the denial pattern preferably is the open/close operation that is performed a second set number of times within the set time period, the second set number of times being greater than the first set number of times.

(4) In this case, if the accelerator sensor detects an operation of keeping a position of the accelerator grip turned to an open side for the set time period or longer while the automated cruise control is in progress, the automated cruise controller preferably stops executing the automated cruise control and allows the vehicle speed of the vehicle to increase to exceed the set vehicle speed.

(5) In this case, the vehicle speed specifier preferably maintains the set vehicle speed if neither the turning operation in the approval pattern nor the turning operation in the denial pattern is detected by the accelerator sensor.

(6) In this case, the driver assistance system preferably is further provided with a forward information acquirer (for example, an external sensor unit 2 described later)

that acquires forward information about a state ahead of the vehicle, wherein if a followable target vehicle, namely a vehicle ahead that meets a followable target condition determined on a basis of the set vehicle speed, is recognized successfully on a basis of the forward information, the automated cruise controller preferably controls the following distance with respect to the followable target vehicle automatically to cause the vehicle to follow the followable target vehicle, and if the followable target vehicle is not recognized successfully on the basis of the forward information, the automated cruise controller preferably controls and adjusts the vehicle speed automatically to the set vehicle speed.

(7) In this case, preferably, the driver assistance system is further provided with a display (for example, a display 41 described later) which is provided at a position visible to the rider at driving and which displays the set vehicle speed and the regulation speed.

(8) In this case, if the set vehicle speed and the regulation speed differ from each other, the vehicle speed specifier preferably displays, on the display, a pending-approval image suggesting that the vehicle is in a state in which the set vehicle speed can be changed to match the regulation speed by way of an operation of the accelerator grip.

(1) The driver assistance system 1 according to the present invention is provided with the accelerator grip turnably operable by the rider, the accelerator sensor that detects a turning operation of the accelerator grip, an automated cruise controller that controls the vehicle speed or the following distance automatically on the basis of the set vehicle speed, and the regulation speed recognizer that recognizes the regulation speed stipulated for the road on which the vehicle is traveling. Thus, according to the present invention, the rider may simply grip the accelerator grip with their hand while the automated cruise controller is executing the automated cruise control based on the set vehicle speed, which is convenient because the rider is not required to hold the accelerator grip in a turning operation to maintain a certain throttle position. Also, in response to the accelerator sensor detecting a turning operation in a predetermined pattern while the automated cruise controller is executing the automated cruise control based on the set vehicle speed, that is, while it is unnecessary for the rider to actively perform a turning operation on the accelerator grip as described above, the vehicle speed specifier changes the set vehicle speed on the basis of a recognition result from the regulation speed recognizer. In this way, in the present invention, the accelerator grip, which does need to be actively used while the automated cruise control is in progress, is utilized as a control element when the rider approves a change in the set vehicle speed based on a recognition result from the regulation speed recognizer, thereby eliminating the need to provide a new switch. Also, according to the present invention, the rider can approve a change in the set vehicle speed easily while the automated cruise control is in progress by simply performing a turning operation in a predetermined pattern while continuing gripping the accelerator grip. Thus, according to the present invention, the rider at driving does not need to let go of the accelerator grip or check the position of a switch near his/her hand, and therefore the burden imposed on the rider can be lessened, resulting in improvement of traffic safety.

(2) In the present invention, if a turning operation in a predetermined approval pattern is detected by the accelerator sensor, the vehicle speed specifier changes the set vehicle speed on the basis of the recognition result, and if a turning operation in a predetermined denial pattern is detected by the accelerator sensor, the vehicle speed specifier maintains the set vehicle speed without a change on the basis of the recognition result. Thus, according to the present invention, the rider can approve or deny a change in the set vehicle speed based on the recognition result while the automated cruise control is in progress by simply performing a turning operation in the approval pattern or the denial pattern while continuing gripping the accelerator grip.

(3) In the present invention, the rider can approve or deny a change in the set vehicle speed while the automated cruise control is in progress by simply performing an open/close operation of the accelerator grip within a preset time period. In many saddle-type vehicles, there is a delay between when the accelerator grip is turned and when the vehicle actually begins to accelerate. Accordingly, in many cases, a rider with the intention of accelerating the vehicle keeps the accelerator grip turned to the open side for a certain time or longer. Thus, according to the present invention, it is possible to differentiate an operation of the accelerator grip according to an acceleration intention by the rider, an operation of the accelerator grip according to an approval intention by the rider, and an operation of the accelerator grip according to a denial intention by the rider.

(4) In the present invention, if an operation of keeping the position of the accelerator grip turned to the open side for a set time period or longer is detected by the accelerator sensor while the automated cruise control is in progress, the automated cruise controller stops executing the automated cruise control and allows the vehicle speed to accelerate beyond the set vehicle speed. Thus, if the rider attempts to accelerate the vehicle beyond the set vehicle speed for some reason while the automated cruise control based on the set vehicle speed is in progress, the rider may simply keep the accelerator grip turned to the open side for the set time period or longer, which is highly convenient.

(5) In the present invention, the vehicle speed specifier maintains the set vehicle speed if neither the turning operation in the approval pattern nor the turning operation in the denial pattern is detected by the accelerator sensor. With this arrangement, a change in the set vehicle speed unintended by the rider and an abrupt change in the vehicle speed can be prevented.

(6) In the driver assistance system according to the present invention, if a followable target vehicle determined on the basis of the set vehicle speed is recognized successfully, the automated cruise controller controls the following distance with respect to the followable target vehicle automatically to follow the followable target vehicle, and if a followable target vehicle is not recognized successfully, the automated cruise controller automatically controls and adjusts the vehicle speed to the set vehicle speed. According to the present invention, the set vehicle speed in the function for automatically following a followable target vehicle determined on the basis of the set vehicle speed or the function for maintaining the vehicle speed at the set vehicle speed as above can be changed on the basis of a turning operation of the accelerator grip, which is highly convenient.

(7) The driver assistance system according to the present invention is further provided with a display that displays the set vehicle speed and the regulation speed. Thus, according to the present invention, the rider can easily recognize the degree of divergence between the set vehicle speed and the regulation speed, and thus can easily judge whether a change of the set vehicle speed based on a recognition result should be approved.

(8) In the driver assistance system according to the present invention, if the set vehicle speed and the regulation speed differ, the vehicle speed specifier displays, on the display, a pending-approval image suggesting that the vehicle is in a state in which the set vehicle speed can be changed to match the regulation speed with an operation of the accelerator grip. With this arrangement, the rider can easily grasp that the vehicle is in a state in which the set vehicle speed can be changed by simply operating the accelerator grip.

BRIEF DESCRIPTION OF THE DRAWINGS

FIG. 3 is a flowchart illustrating a specific procedure of the automated cruise control by the automated cruise controller;

DETAILED DESCRIPTION OF THE INVENTION

Hereinafter, a configuration of a driver assistance system according to an embodiment of the present invention will be described with reference to the drawings.

Figure 1:
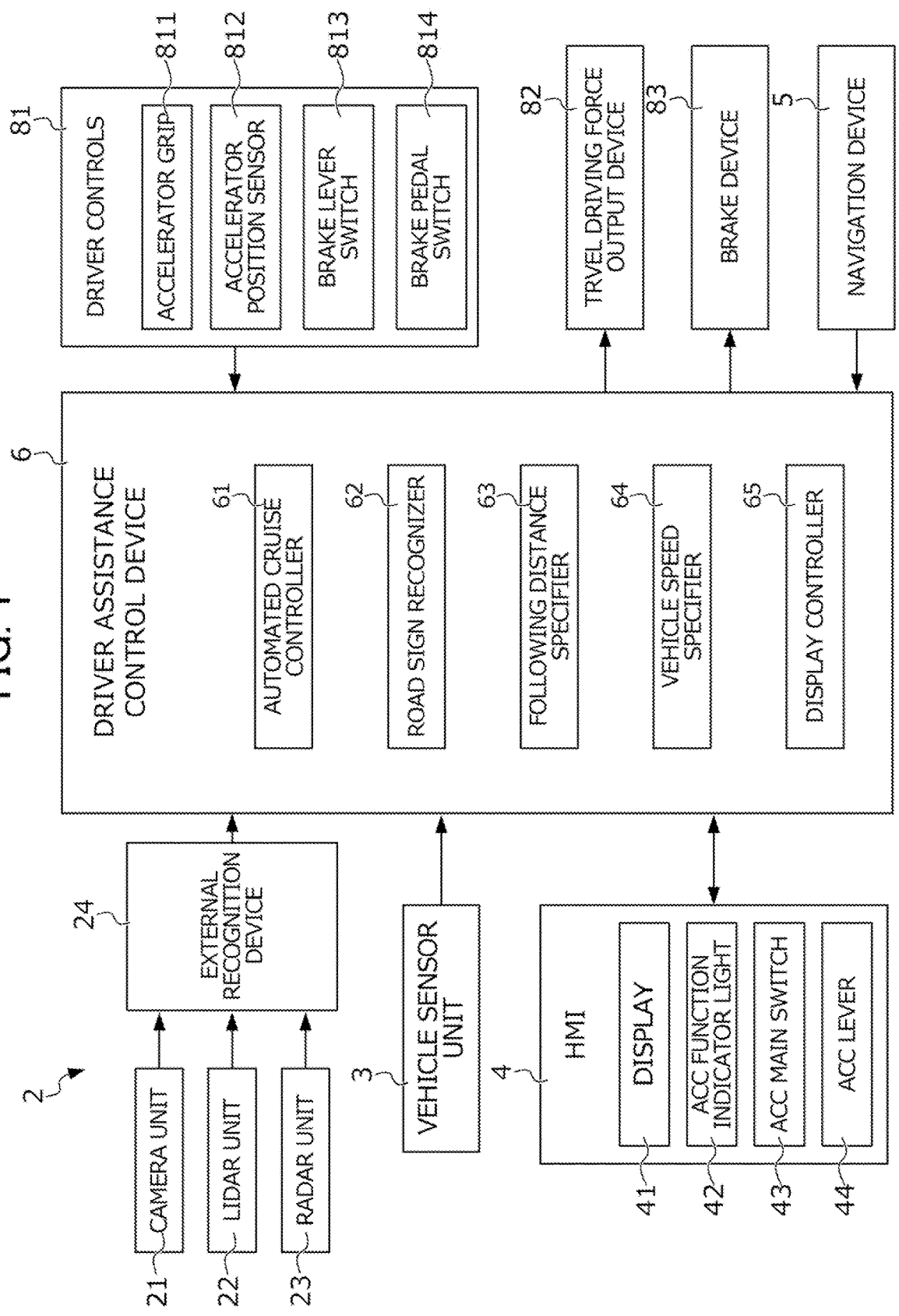
FIG. 1 is a diagram that schematically illustrates a configuration of a driver assistance system according to an embodiment of the present invention.

FIG. 1 is a diagram illustrating a configuration of a driver assistance system 1 according to the present embodiment. The driver assistance system 1 is installed in a motorcycle, not illustrated, as a saddle-type vehicle. Note that the drive source of the motorcycle may be an internal combustion engine, a rotary electric motor, or a combination of the two. Also, the power source of the rotary electric motor may be a secondary battery, a capacitor, or a fuel cell. Note that although the following describes the case in which the driver assistance system 1 is applied to a motorcycle, the present invention is not limited thereto. The present invention applicable to a saddle-type vehicle other than a motorcycle, such as a three-wheeled saddle-type vehicle, a four-wheeled saddle-type vehicle, and a motorized bicycle.

The driver assistance system 1 assists with safe driving of a motorcycle by the driver. Among the various driver assistance functions achieved by the driver assistance system 1, the following describes an ACC function that automatically controls at least one selected from the following distance to the vehicle ahead and the speed of the driver's own vehicle (hereinafter also referred to as the "vehicle speed") to follow the vehicle ahead and a TSR function that recognizes road signs stipulated for the road on which the vehicle is traveling and displays recognized information on a display at suitable timings to prompt the driver to pay attention to the road signs.

The driver assistance system 1 is provided with an external sensor unit 2, a vehicle sensor unit 3, a human-machine interface (HMI) 4 (hereinafter, the abbreviation "HMI 4" will be used), a navigation device 5, a driver assistance control device 6, driver controls 81, a travel driving force output device 82, and a brake device 83. These devices are interconnected by multiple communication lines such as controller area network (CAN) communication lines, serial communication lines, or a wireless communication network.

The external sensor unit 2 includes a camera unit 21, a lidar unit 22, a radar unit 23, an external recognition device 24, and the like.

The camera unit 21 is provided with a digital camera using a solid-state image sensor such as a charge-coupled device (CCD) sensor or a complementary metal-oxide semiconductor (CMOS) sensor, for example. The lidar unit 22 is provided with a light detection and ranging (LIDAR) function for detecting an object by measuring light scattered from the object in response to pulsed laser irradiation. The radar unit 23 is provided with a millimeter-wave radar that detects an object by emitting a millimeter wave and measuring the reflected wave thereof returning from the object. Note that the camera unit 21, the lidar unit 22, and the radar unit 23 are each mounted to any location of the motorcycle, such as the front windshield or a mirror, for example, and face the direction ahead of the vehicle.

The external recognition device 24 is a computer that applies sensor fusion processing to detection results from some or all of the camera unit 21, the lidar unit 22, and the radar unit 23, and thereby obtains information pertaining to the state ahead of the vehicle, and more specifically, information about the road and the positions, shapes, types, and speeds of objects as well as the content of road signs and the like existing ahead of the vehicle (hereinafter collectively referred to as "forward information"). The external recognition device 24 transmits the acquired forward information to the driver assistance control device 6, for example.

The vehicle sensor unit 3 is provided with a vehicle speed sensor that detects the vehicle speed, a 5-axis or 6-axis inertial measurement device, and the like. The inertial measurement device detects the angle or angular velocity and the acceleration of the vehicle body of the vehicle on three axes (roll axis, pitch axis, and yaw axis). A detection signal from the vehicle sensor unit 3 is transmitted to the driver assistance control device 6, for example.

The HMI 4 includes a plurality of interfaces that present various information to an occupant of the vehicle and receive input operations performed by the occupant. FIG. 1 illustrates in particular only the components among the plurality of interfaces included in the HMI 4 that are related to the ACC function and the TSR function, namely a display 41, an ACC function indicator light 42, an ACC main switch 43, and an ACC lever 44.

The display 41 is provided at a position visible to the rider at driving, and displays an image corresponding to a command from a display controller 65 described later of the driver assistance control device 6. Information related to a recognition result from a road sign recognizer 62 described later, information related to a set vehicle speed set by a vehicle speed specifier 64 described later, and the like are displayed on the display 41. Note that specific examples of images displayed on the display 41 will be described later with reference to FIGS. 2A to 2C and FIG. 6.

The ACC main switch 43 is depressed by the rider when switching on/off the ACC function provided by the driver assistance control device 6. The ACC main switch 43 is located at the base of an accelerator grip 811 described later, for example. Accordingly, the rider is able to operate the ACC main switch 43 with the thumb of the right hand that grips the accelerator grip 811.

More specifically, if the rider presses the ACC main switch 43 when the ACC function provided by the driver assistance control device 6 is in the turned-off state, the ACC function goes to a standby state. Also, if the rider presses the ACC main switch 43 when the ACC function provided by the driver assistance control device 6 is in the turned-on state or the standby state, the ACC function goes to the turned-off state.

The ACC lever 44 is turned by the rider to change the set vehicle speed in the ACC function or to make the ACC function go from the standby state to the turned-on state. The ACC lever 44 can be turned from a neutral position to either a "RES/+" side or a "SET/−" side. The ACC lever 44 is located at the base of the accelerator grip 811 described later, for example. Accordingly, the rider is able to operate the ACC lever 44 with the thumb of the right hand that grips the accelerator grip 811.

More specifically, if the rider turns the ACC lever 44 to the "SET/−" side when the ACC function provided by the driver assistance control device 6 is in the standby state, the ACC function goes to the turned-on state and the vehicle speed at that time is set as a set vehicle speed. That is, the rider can first cause the ACC function to go from the turned-off state to the standby state by pressing the ACC main switch 43, and then cause the ACC function to go to the turned-on state by turning the ACC lever 44 to the "SET/−" side.

Also, if the rider turns the ACC lever 44 to the "RES/+" side when the ACC function provided by the driver assistance control device 6 is in the standby state, a value stored in a memory not illustrated (the set vehicle speed from the previous turned-on state) is set as the set vehicle speed and the ACC function goes to the turned-on state.

Also, if the rider turns the ACC lever 44 to the "RES/+" side when the ACC function provided by the driver assistance control device 6 is in the turned-on state and the vehicle speed is equal to or greater than a predetermined speed, the set vehicle speed is increased in increments of a predetermined unit speed (for example, 1 [km/h]). Also, if the rider turns the ACC lever 44 to the "SET/−" side when the ACC function provided by the driver assistance control device 6 is in the turned-on state and the vehicle speed is equal to or greater than a predetermined speed, the set vehicle speed is decreased in decrements of the unit speed.

The ACC function indicator light 42 can emit light in a plurality of ways, such as red, green, and white, for example. The ACC function indicator light 42 is located at a position visible to the rider at driving. In the case in which the ACC function is in the turned-on state and an automated following distance control described later is in effect, the ACC function indicator light emits red light. In the case in which the ACC function is in the turned-on state and an automated speed control described later is in effect, the ACC function indicator light emits green light. Also, in the case in which the ACC function is in the standby state, the ACC function indicator light emits white light. Also, in the case in which the ACC function is in the turned-off state, the ACC function indicator light emits no light. Consequently, if the ACC main switch 43 is turned on by the rider, the ACC function indicator light emits light selected from red, green, and white. Also, if the ACC main switch 43 is turned off by the rider, the ACC function indicator light emits no light.

The navigation device 5 is provided with a global navigation satellite system (GNSS) receiver that specifies the current location of the vehicle on the basis of signals received from GNSS satellites, and a storage device storing map information, for example. The map information in this case also includes information related to road signs. The navigation device 5 transmits information pertaining to the current location of the vehicle, together with map information for the current location, to the driver assistance control device 6.

The driver controls 81 include a plurality of control elements operated when the rider drives the vehicle, and sensors or the like that detect the control inputs of the control elements. Note that FIG. 1 illustrates in particular only the components among the plurality of control elements and sensors that are related to the ACC function and the TSR function, namely an accelerator grip 811, an accelerator position sensor 812, a brake lever switch 813, and a brake pedal switch 814.

The accelerator grip 811 is turnably operable by the rider to accelerate or decelerate the vehicle. The accelerator grip 811 is located at a position that the rider at driving can grip with the right hand. The accelerator grip 811 is freely turnable between a fully closed position (neutral position) and a fully open position. The position of the accelerator grip 811 (hereinafter also referred to as the "accelerator position") is returned to the neutral position by an elastic member, not illustrated, if no external force is acting upon the accelerator grip 811. Hereinafter, the direction going from the neutral position toward the fully open position is also referred to as the opening direction, and the direction going from the fully open position toward the neutral position is also referred to as the closing direction. In other words, if the ACC function provided by the driver assistance control device 6 is in the turned-off state or the standby state, the rider can accelerate or decelerate the vehicle by turning the accelerator grip 811 in the opening direction or the closing direction between the neutral position and the fully open position.

In addition, the accelerator grip 811 is also freely turnable between the neutral position and a minus position on the opposite side of the fully open position. Note that hereinafter, an operation of turning the accelerator grip 811 from the neutral position toward the minus position is also referred to as a minus operation.

The accelerator position sensor 812 is a sensor that detects a turning operation of the accelerator grip 811. The accelerator position sensor 812 detects the accelerator position and transmits a detection signal corresponding to a detection value to the driver assistance control device 6.

The brake lever switch 813 is a sensor that detects the turning on/off of a brake lever (not illustrated) that can be squeezed by the rider's right hand to apply braking to the front wheel with the brake device 83. The brake lever switch 813 transmits a signal corresponding to the turning on/off of the brake lever to the driver assistance control device 6.

The brake pedal switch 814 is a sensor that detects the turning on/off of a brake pedal (not illustrated) that can be stepped on by the rider's right foot to apply braking to the rear wheel with the brake device 83. The brake pedal switch 814 transmits a signal corresponding to the turning on/off of the brake pedal to the driver assistance control device 6.

The travel driving force output device 82 outputs, to the drive wheel, a travel driving force causing the vehicle to travel. The travel driving force output device 82 is provided with, for instance, a driving power source such as an internal combustion engine or a rotary electric motor, a transmission, and an electronic control unit that controls the driving power source and the transmission on the basis of a command signal transmitted from the driver assistance control device 6 and generates acceleration or deceleration according to a command.

The brake device 83 is provided with, for example, brake calipers, a cylinder that transmits oil pressure to the brake calipers according to the control input of the brake lever or the brake pedal, an electric motor that generates oil pressure in the cylinder, and an electronic control unit that controls the electric motor on the basis of a command signal transmitted from the driver assistance control device 6 and causes braking force to be generated according to the command.

The driver assistance control device 6 is a computer responsible for control related to the driver assistance functions. The driver assistance control device 6 is provided with an automated cruise controller 61, a road sign recognition unit 62, a following distance specifier 63, a vehicle speed specifier 64, and a display controller 65 as modules for achieving the ACC function and the TSR function among a plurality of driver assistance functions.

When the ACC function is in the turned-on state, the automated cruise controller 61 executes an automated following distance control that automatically controls the following distance with respect to the vehicle ahead on the basis of a set vehicle speed set by the vehicle speed specifier 64 described later or an automated speed control that controls the vehicle speed on the basis of the set vehicle speed. Note that hereinafter, the automated speed control and the automated following distance control performed by the automated cruise controller 61 are also collectively referred to as the automated cruise control.

More specifically, when the ACC function is in the turned-on state, the automated cruise controller 61 recognizes a vehicle ahead on the basis of the forward information acquired by the external recognition device 24, further recognizes the vehicle ahead as a followable target vehicle if the vehicle ahead satisfies a followable target condition determined on the basis of the set vehicle speed, and follows the followable target vehicle by automatically controlling the following distance with respect to followable target vehicle. More specifically, if the ACC function is in the turned-on state and the followable target vehicle is successfully recognized on the basis of the forward information, the automated cruise controller 61 executes the automated following distance control to follow the followable target vehicle while operating the travel driving force output device 82 and the brake device 83 such that the following distance with respect to the followable target vehicle becomes equal to a target following distance successively set by the vehicle speed specifier 64 described later.

Also, if the ACC function is in the turned-on state but a followable target vehicle as described above is not successfully recognized on the basis of the forward information acquired by the external recognition device 24, the automated cruise controller 61 automatically controls the vehicle speed specified by the vehicle sensor unit 3. More specifically, if the ACC function is in the turned-on state and the followable target vehicle is not successfully recognized on the basis of the forward information, the automated cruise controller 61 executes the automated speed control to operate the travel driving force output device 82 and the brake device 83 such that the vehicle speed becomes equal to the set vehicle speed.

Here, the case in which the followable target vehicle is not successfully recognized on the basis of the forward information includes not only the case in which a vehicle ahead does not exist ahead of the rider's own vehicle and within the range recognizable by the external recognition device 24, but also the case in which, although a vehicle ahead exists ahead of the rider's own vehicle and within the range recognizable by the external recognition device 24, the vehicle ahead does not satisfy the followable target condition. Additionally, the followable target condition in the present embodiment is that, for example, the following distance with respect to the vehicle ahead is less than a preset distance and the vehicle speed of the vehicle ahead is less than the set vehicle speed. That is, even if a vehicle ahead exists within the range recognizable by the external recognition device 24, the automated cruise controller 61 does not recognize the vehicle ahead as the followable target vehicle if the vehicle ahead is at least the set distance away from the rider's own vehicle or if the vehicle ahead is traveling at the set vehicle speed or faster. For this reason, the vehicle speed does not regularly exceed the set vehicle speed while the automated following distance control is in effect and the followable target vehicle is being followed.

Additionally, as described above, the automated cruise controller 61 automatically controls the vehicle speed using the set vehicle speed as a target while the automated speed control is in effect. For this reason, the vehicle speed likewise does not regularly exceed the set vehicle speed while the automated speed control is in effect. Consequently, while the automated cruise controller 61 is executing the automated cruise control, the vehicle speed does not regularly exceed the set vehicle speed or automatically increases to exceed the set vehicle speed.

The road sign recognizer 62 recognizes road signs stipulated for the road on which the vehicle is traveling, on the basis of forward information acquired by the external recognition device 24, current location information about the vehicle and map information transmitted from the navigation device 5, and the like. The road sign recognizer 62 transmits information related to recognized road signs to the display controller 65 and the vehicle speed specifier 64. Also, if a recognized road sign is a sign regulating the vehicle speed, the road sign recognizer 62 recognizes the speed (for example, a top speed) specified by the sign, and transmits the recognized speed to the vehicle speed specifier 64 as a regulation speed.

When the ACC function is in the turned-on state, the following distance specifier 63 sets a target following distance for the automated following distance control by the automated cruise controller 61. More specifically, the following distance specifier 63 sets the target following distance on the basis of forward information acquired by the external recognition device 24 and a detection result from the vehicle sensor unit 3. More specifically, the following distance specifier 63 calculates the vehicle speed of the followable target vehicle and the actual following distance between the rider's own vehicle and the followable target vehicle on the basis of the forward information, and additionally sets the target following distance such that the faster the vehicle speed of the followable target vehicle is, the longer the target following distance is. The following distance specifier 63 transmits information related to the set target following distance to the automated cruise controller 61.

When the ACC function is in the turned-on state, the vehicle speed specifier 64 sets the set vehicle speed for the automated cruise control by the automated cruise controller 61 and transmits information related to the set vehicle speed to the automated cruise controller 61 and the display controller 65.

In the vehicle speed specifier 64, the set vehicle speed can be set or changed in a manual mode or a TSR linked mode as the setting mode.

In the manual mode, the vehicle speed specifier 64 sets or changes the set vehicle speed on the basis of an operation on the HMI 4 (in particular, the ACC lever 44) by the rider. More specifically, when the ACC function is in the standby state and the ACC lever 44 is detected as being turned to the "SET/−" side, the vehicle speed specifier 64 sets the vehicle speed at that time as the set vehicle speed. When the ACC function is in the standby state and the ACC lever 44 is detected as being turned to the "RES/+" side, the vehicle speed specifier 64 sets the value stored in the memory as the set vehicle speed. When the ACC function is in the turned-on state, the vehicle speed is equal to or greater than a predetermined speed, and the ACC lever 44 is detected as being turned to "RES/+" side, the vehicle speed specifier 64 increases the set vehicle speed in increments of the unit speed. Also, when the ACC function is in the turned-on state, the vehicle speed is equal to or greater than a predetermined speed, and the ACC lever 44 is detected as being turned to "SET/−" side, the vehicle speed specifier 64 decreases the set vehicle speed in decrements of the unit speed. Consequently, the rider can operate the ACC lever 44 to change the set vehicle speed or set a new set vehicle speed.

In the TSR linked mode, the vehicle speed specifier 64 changes the set vehicle speed automatically on the basis of a recognition result from the road sign recognizer 62. More specifically, if the ACC function is in the turned-on state and the current set vehicle speed is different from the regulation speed recognized by the road sign recognizer 62, the vehicle speed specifier 64 changes the set vehicle speed to match the regulation speed after obtaining approval from the rider. Note that a specific procedure for changing the set vehicle speed in the TSR linked mode will be described in detail later with reference to FIG. 5.

The display controller 65 notifies the rider of information related to the TSR function and the ACC function by causing the display 41 to display information related to the TSR function by the road sign recognizer 62, information related to the ACC function by the automated cruise controller 61, the following distance specifier 63, and the vehicle speed specifier 64, and the like.

Figure 2A:
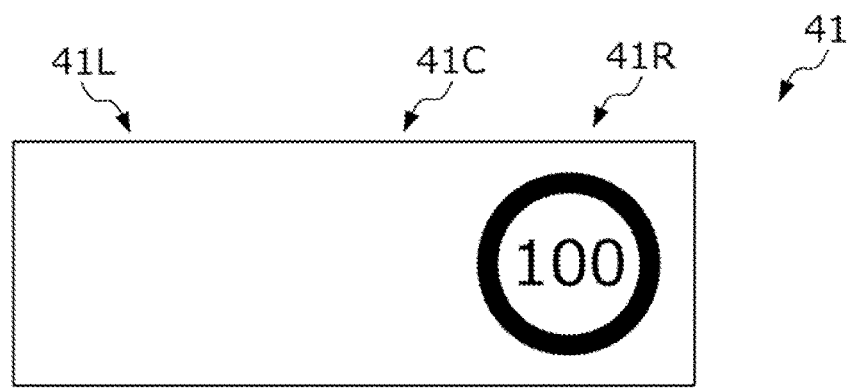
FIG. 2A is a diagram illustrating an example of an image displayed on a display in a case in which the ACC function is in a turned-off state and the TSR function is in a turned-on state.
Figure 2B:
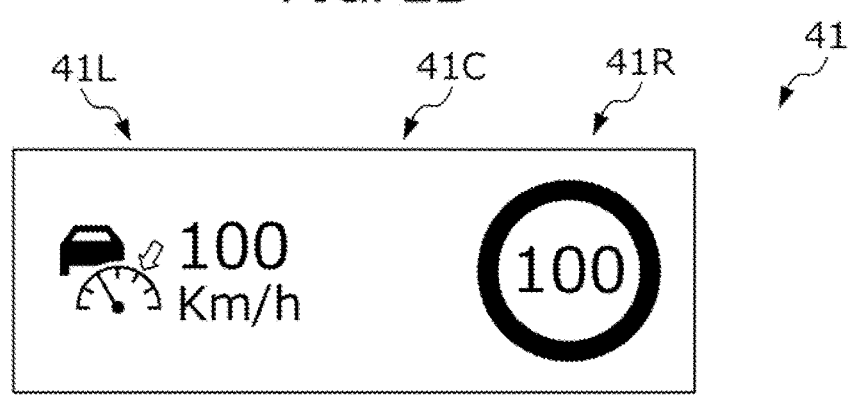
FIG. 2B is a diagram illustrating an example of an image displayed on a display in a case in which the ACC function is in the turned-on state and the TSR function is in the turned-on state.
Figure 2C:
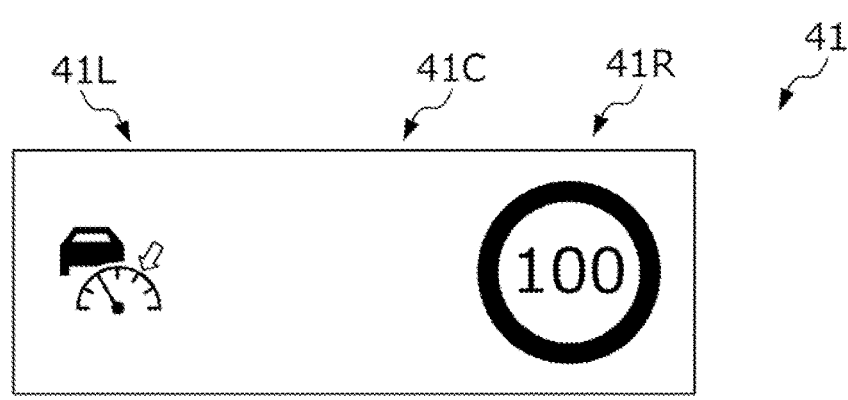
FIG. 2C is a diagram illustrating an example of an image displayed on a display in a case in which the ACC function is in a standby state and the TSR function is in the turned-on state.

FIGS. 2A to 2C are diagrams illustrating examples of images displayed on the display 41 under control by the display controller 65. As illustrated in FIGS. 2A to 2C as examples, the display 41 is divided into a right area 41R on the right side from the point of view of the rider, a left area 41L on the left side from the point of view of the rider, and a center area 41C between the right area 41R and the left area 41L, in which information related to the TSR function is mainly displayed in the right area 41R and information related to the ACC function is mainly displayed in the left area 41L.

FIG. 2A is a diagram illustrating an example of an image displayed on the display 41 in a case in which the ACC function is in the turned-off state and the TSR function is in the turned-on state. As illustrated in FIG. 2A, if the ACC function is in the turned-off state, the display controller 65 causes nothing to be displayed in the left area 41L, and causes information related to the TSR function to be displayed in the right area 41R. As illustrated in FIG. 2A, the display controller 65 causes a recognition result from the road sign recognizer 62, more specifically an image of a road sign recognized by the road sign recognizer 62, to be displayed as information related to the TSR function in the right area 41R. Note that the examples in FIGS. 2A to 2C illustrate a case in which the road sign recognizer 62 has recognized a regulation sign indicating that a top speed of 100 [km/h] is allowed on the road on which the vehicle is traveling.

FIG. 2B is a diagram illustrating an example of an image displayed on the display 41 in a case in which the ACC function is in the turned-on state and the TSR function is in the turned-on state. As illustrated in FIG. 2B, if the ACC function is in the turned-on state, the display controller 65 causes icons indicating a vehicle ahead and the speedometer of the rider's own vehicle together with the current set vehicle speed (in the example in FIG. 2B, the set vehicle speed is 100 [km/h]) to be displayed in the left area 41L.

FIG. 2C is a diagram illustrating an example of an image displayed on the display 41 in a case in which the ACC function is in the standby state and the TSR function is in the turned-on state. As illustrated in FIG. 2C, if the ACC function is in the standby state, the display controller 65 causes only the icons indicating a vehicle ahead and the speedometer of the rider's own vehicle to be displayed in the left area 41L. That is, if the ACC function is in the standby state, the display controller 65 does not cause the set vehicle speed to be displayed.

FIG. 3 is a flowchart illustrating a specific procedure of the automated cruise control by the automated cruise controller 61. The process illustrated in FIG. 3 is repeatedly executed on a predetermined control cycle by the automated cruise controller 61 while the ACC main switch 43 of the HMI 4 is switched on, that is, while the driver is expressing an intention to have the ACC function switched on. Note that each step illustrated in FIG. 3 is achieved by the automated cruise controller 61 executing a computer program stored in a storage device, not illustrated, while the ACC main switch 43 is switched on.

First, in step ST1, the automated cruise controller 61 executes a state flag updating process for updating the value of a state flag, and proceeds to step ST2.

The state flag is a flag indicating the state of the ACC function, and may take a value selected from "0", "1", and "2". The state flag with a value of "0" indicates that the ACC function is in the turned-on state. The state flag with a value of "1" indicates that the ACC function is in the standby state. Also, the state flag with a value of "2" indicates that the ACC function is in a temporary standby state. Note that the value of the state flag is set to "1" immediately after the ACC main switch 43 is switched on.

Figure 4:
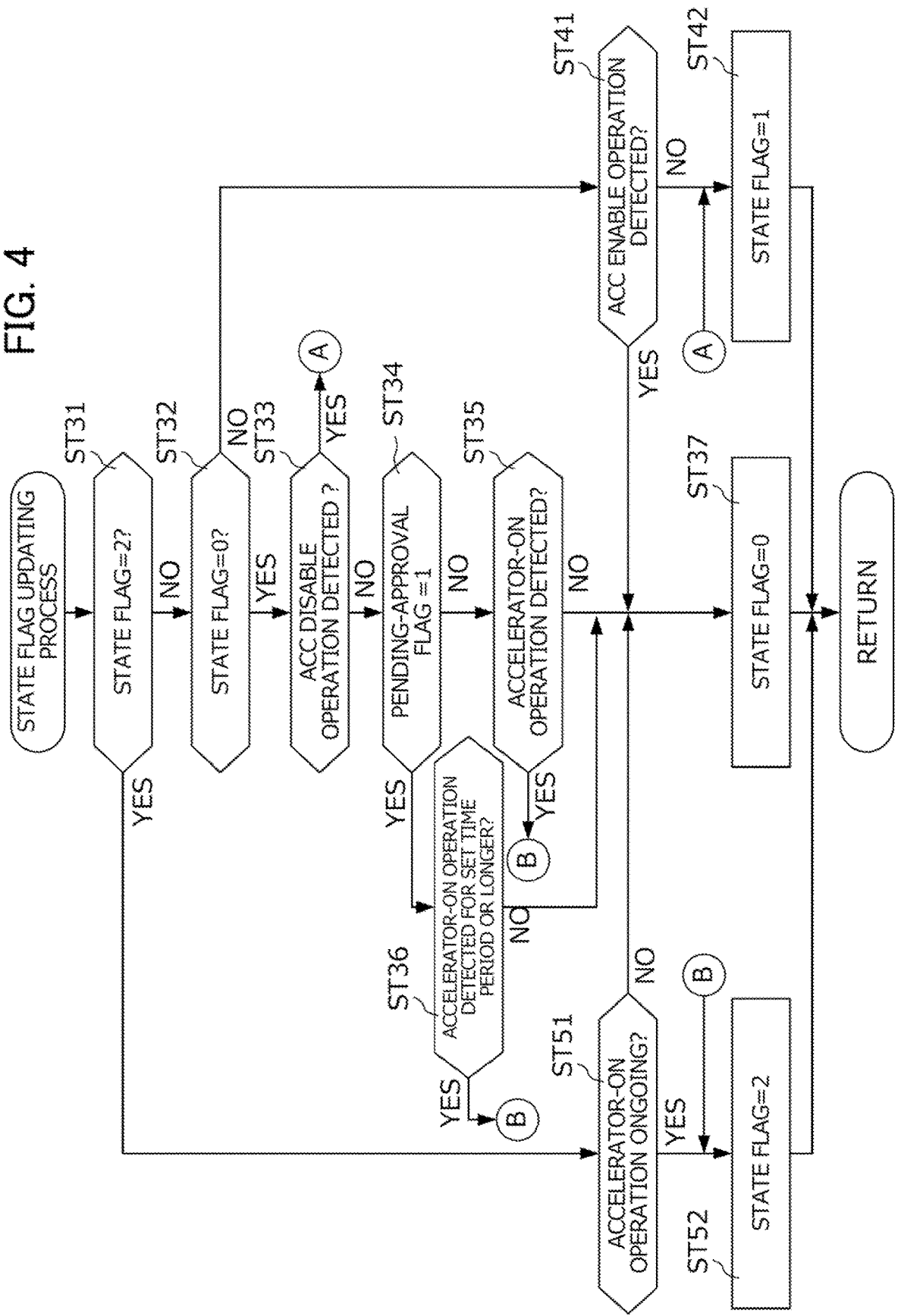
FIG. 4 is a flowchart illustrating a specific procedure of a state flag updating process.

FIG. 4 is a flowchart illustrating a specific procedure of the state flag updating process.

First, in step ST31, the automated cruise controller 61 determines whether or not the current value of the state flag is "2". If the determination result in step ST31 is YES, the automated cruise controller 61 proceeds to step ST51 described later, and if NO, the automated cruise controller 61 proceeds to step ST32.

In step ST32, the automated cruise controller 61 determines whether or not the current value of the state flag is "0". If the determination result in step ST32 is YES, the automated cruise controller 61 proceeds to step ST33, and if NO, the automated cruise controller 61 proceeds to step ST41 described later.

In step ST33, the automated cruise controller 61 determines whether or not an ACC disable operation by the rider is detected. The ACC disable operation is an operation that the rider performs to change the ACC function from the turned-on state to the standby state, and includes a minus operation of the accelerator grip 811, an operation of squeezing the brake lever, an operation of stepping on the brake pedal, and the like. The automated cruise controller 61 determines whether or not the ACC disable operation is detected on the basis of detection signals from the accelerator position sensor 812, the brake lever switch 813, and the brake pedal switch 814. If the determination result in step ST33 is YES, that is, in the case of detecting the ACC disable operation when the ACC function is in the turned-on state, the automated cruise controller 61 proceeds to step ST42 and changes the value of the state flag from "0" to "1". With this arrangement, the ACC function goes from the turned-on state to the standby state.

Also, if the determination result in step ST33 is NO, the automated cruise controller 61 proceeds to step ST34. In step ST34, the automated cruise controller 61 determines whether or not the value of a pending-approval flag described later is "1". As described later with reference to FIG. 5, the pending-approval flag is a flag that explicitly indicates a state of waiting for approval from the rider regarding a change in the set vehicle speed based on a recognition result from the road sign recognizer 62, and is updated by a set vehicle speed changing process (see FIG. 5) described later in the vehicle speed specifier 64. If the determination result in step ST34 is NO, the automated cruise controller 61 proceeds to step ST35.

In step ST35, the automated cruise controller 61 determines whether or not an accelerator-on operation is detected. The accelerator-on operation refers to an operation in which the rider turns the accelerator grip to move the accelerator position from the fully closed position toward the fully open position. If the determination result in step ST35 is YES, that is, in the case in which the rider performs the accelerator-on operation when the ACC function is in the turned-on state, the automated cruise controller 61 proceeds to step ST52 and changes the value of the state flag from "0" to "2". With this arrangement, the ACC function goes from the turned-on state to a temporary standby state, and thus the rider can accelerate the vehicle by operating the accelerator grip manually.

Also, if the determination result in step ST35 is NO, that is, in the case of detecting neither the ACC disable operation nor the accelerator-on operation when the ACC function is in the turned-on state, the automated cruise controller 61 proceeds to step ST37 and maintains the value of the state flag at "0". Consequently, in the case in which neither the ACC disable operation nor the accelerator-on operation for a set time period or longer is detected when the ACC function is in the turned-on state, the automated cruise controller 61 maintains the ACC function in the turned-on state.

If the determination result in step ST34 is YES, that is, if the value of the pending-approval flag is "1", the automated cruise controller 61 proceeds to step ST36. In step ST36, the automated cruise controller 61 determines whether or not the accelerator-on operation is detected for a set time period or longer. If the determination result in step ST36 is YES, that is, in the case in which the rider keeps performing the accelerator-on operation for the set time period or longer when the ACC function is in the turned-on state and the pending-approval state described later, the automated cruise controller 61 proceeds to step ST52 and changes the value of the state flag from "0" to "2". With this arrangement, the ACC function goes from the turned-on state to a temporary standby state, and thus the rider can accelerate the vehicle by operating the accelerator grip manually. Also, if the determination result in step ST36 is NO, the automated cruise controller 61 proceeds to step ST37 and maintains the value of the state flag at "0". As above, if the ACC function is in the turned-on state and the pending-approval state described later, the rider can accelerate the vehicle on the basis of a manual operation of the accelerator grip by continuing to perform the accelerator-on operation for the set time period or longer.

In step ST41, the automated cruise controller 61 determines whether or not an ACC enable operation by the rider is detected. The ACC enable operation refers to an operation that the rider performs to change the ACC function from the standby state to the turned-on state, and includes an operation of turning the ACC lever 44, for example. If the determination result in step ST41 is YES, that is, in the case of detecting the ACC enable operation when the ACC function is in the standby state, the automated cruise controller 61 proceeds to step ST37 and changes the value of the state flag from "1" to "0". With this arrangement, the ACC function goes from the standby state to the turned-on state.

If the determination result in step ST41 is NO, that is, in the case of not detecting the ACC enable operation when the ACC function is in the standby state, the automated cruise controller 61 proceeds to step ST42 and maintains the value of the state flag at "1". Consequently, the automated cruise controller 61 maintains the ACC function in the turned-on state if the ACC enable operation is not detected when the ACC function is in the standby state.

In step ST51, the automated cruise controller 61 determines whether or not the accelerator-on operation is ongoing. That is, the automated cruise controller 61 determines whether or not the accelerator-on operation continues to be detected after the initial detection of the accelerator-on operation when the ACC function is in the turned-on state in step ST35 or step ST36 described above. If the determination result in step ST51 is YES, the automated cruise controller 61 proceeds to step ST52 and maintains the value of the state flag at "2".

Also, if the determination result in step ST51 is NO, that is, in the case of detecting an operation of returning the accelerator grip to the fully closed position, the automated cruise controller 61 proceeds to step ST37 and changes the value of the state flag from "2" to "0". With this arrangement, the ACC function goes from the temporary standby state to the turned-on state. As above, if the accelerator-on operation is detected when the ACC function is in the turned-on state, the automated cruise controller 61 temporarily puts the ACC function into the standby state while the accelerator-on operation continues to be detected in an ongoing way. Also, after the ACC function is temporarily changed to the standby state, if an operation of returning the accelerator grip to the fully closed position is detected, the automated cruise controller 61 puts the ACC function into the turned-on state automatically. Accordingly, if the ACC function is put into the turned-on state and the vehicle is following a vehicle ahead according to the automated following distance control described later, and during this time the rider attempts to pass the vehicle ahead, the rider can put the ACC function into the standby state temporarily by simply turning the accelerator grip without performing the ACC disable operation as described above, and thereby accelerate the vehicle. Moreover, if the ACC function is put into the standby state temporarily in this way and the vehicle passes the vehicle ahead, the rider can put the ACC function back into the turned-on state automatically by simply returning the accelerator grip to the fully closed position, without performing the ACC enable operation as described above.

Returning to FIG. 3, in step ST2, the automated cruise controller 61 determines whether or not the value of the state flag is "1" or "2", that is, whether or not the ACC function is in the standby state.

If the determination result in step ST2 is NO, that is, if the ACC function is in the turned-on state, the automated cruise controller 61 proceeds to step ST3. In step ST3, the automated cruise controller 61 acquires forward information about the state ahead of the vehicle from the external recognition device 24, additionally acquires the current set vehicle speed from the vehicle speed specifier 64, and proceeds to step ST4.

Next, in step ST3, the automated cruise controller 61 acquires the current set vehicle speed from the vehicle speed specifier 64, and proceeds to step ST4.

In step ST4, the automated cruise controller 61 determines whether or not a followable target vehicle is recognized successfully on the basis of the forward information and the set vehicle speed acquired in step ST3. In other words, the automated cruise controller 61 determines, on the basis of the forward information acquired from the external recognition device 24, whether or not a vehicle ahead traveling in front of the rider's own vehicle exists and meets a followable target condition set on the basis of the set vehicle speed.

If the determination result in step ST4 is YES, that is, if the followable target vehicle is recognized successfully, the automated cruise controller 61 proceeds to step ST5 and executes the automated following distance control. More specifically, in step ST5, the automated cruise controller 61 acquires the current target following distance from the following distance specifier 63, and proceeds to step ST6.

In step ST6, the automated cruise controller 61 calculates an acceleration/deceleration instruction value on the basis of a known feedback algorithm so that the actual following distance with respect to the followable target vehicle becomes equal to the target following distance, and proceeds to step ST7.

In step ST7, the automated cruise controller 61 causes the ACC function indicator light 42 to emit red light to explicitly indicate that the automated following distance control is currently in progress, and proceeds to step ST20.

On the other hand, if the determination result in step ST4 is NO, that is, if the followable target vehicle is not recognized successfully (in other words if a vehicle ahead does not exist or if the vehicle ahead does not meet the followable target condition), the automated cruise controller 61 proceeds to step ST10 and executes an automated speed control.

In step ST10, the automated cruise controller 61 calculates, on the basis of a known feedback algorithm, an acceleration/deceleration instruction value that allows the vehicle speed specified by the vehicle sensor unit 3 to be equal to the set vehicle speed acquired in step ST3, and proceeds to step ST11.

In step ST11, the automated cruise controller 61 causes the ACC function indicator light 42 to emit green light to explicitly indicate that the automated speed control is currently in progress, and proceeds to step ST20.

In step ST20, the automated cruise controller 61 executes the automated following distance control or the automated speed control, and ends the process illustrated in FIG. 3. More specifically, the automated cruise controller 61 operates the travel driving force output device 82 and the brake device 83 on the basis of the acceleration/deceleration instruction value calculated in step ST6 or step ST10, and ends the process illustrated in FIG. 3.

Also, if the determination result in step ST2 is YES, that is, if the ACC function is in the standby state, the automated cruise controller 61 proceeds to step ST15. In step ST15, the automated cruise controller 61 causes the ACC function indicator light 42 to emit white light to explicitly indicate that the ACC function is currently in the standby state, and ends the process illustrated in FIG. 3. As above, if the ACC function is in the standby state, the automated cruise controller 61 does not execute the automated cruise control such as the automated following distance control and the automated speed control indicated in step ST20, and therefore the rider can accelerate or decelerate the vehicle on the basis of manual operations of turning the accelerator grip.

Figure 5:
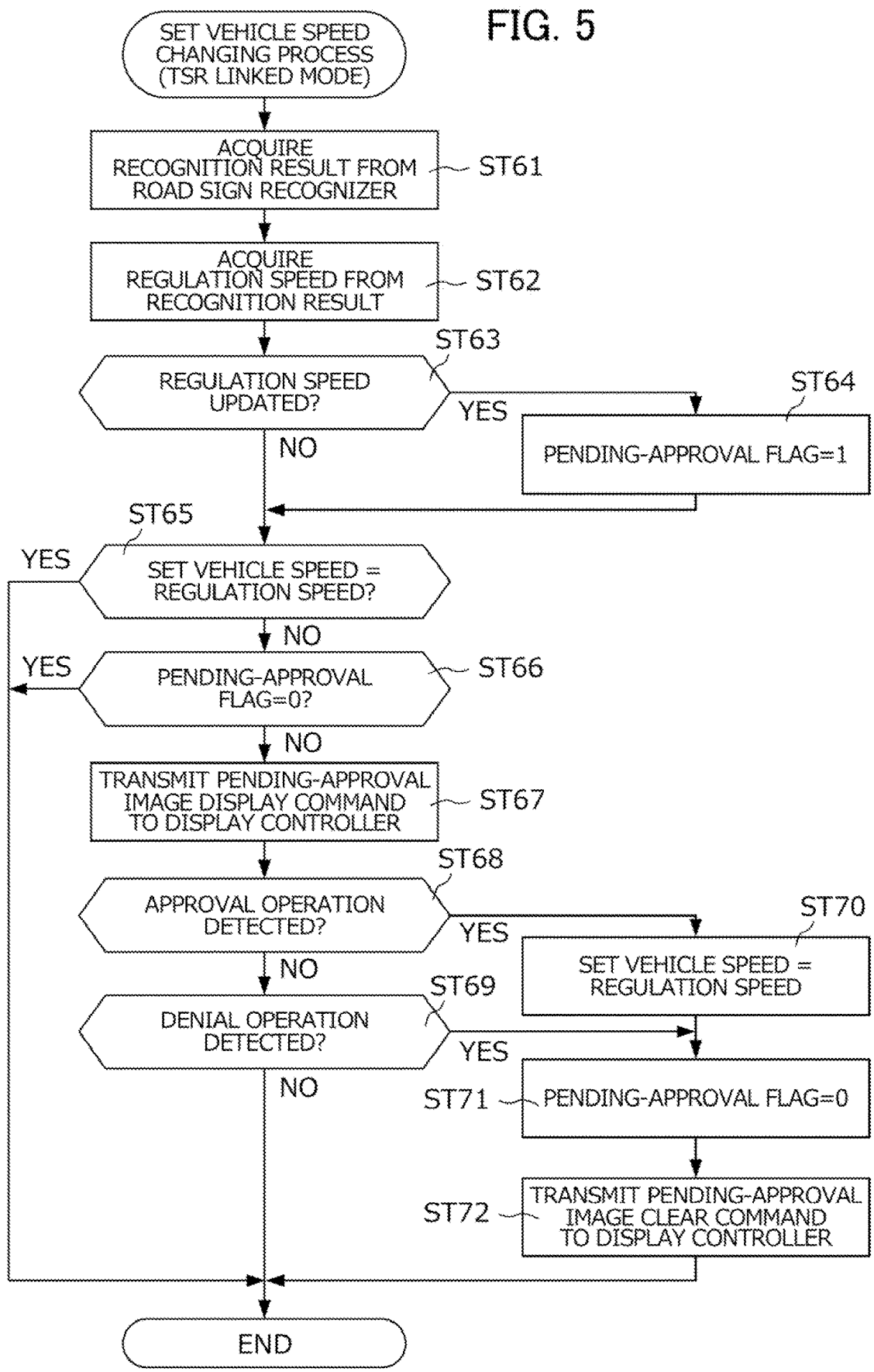
FIG. 5 is a flowchart illustrating a specific procedure of a set vehicle speed changing process in a TSR linked mode.

FIG. 5 is a flowchart illustrating a specific procedure of the set vehicle speed changing process in the TSR linked mode. The process illustrated in FIG. 5 is repeatedly executed on a predetermined control cycle by the vehicle speed specifier 64 while the ACC function provided by the automated cruise controller 61 is in the turned-on state, or in other words, while the automated cruise controller 61 is executing the automated cruise control (including the automated following distance control and the automated speed control) based on the set vehicle speed. Note that each step illustrated in FIG. 5 is achieved by the vehicle speed specifier 64 executing a computer program stored in a storage device, not illustrated, while the ACC function is in the turned-on state.

First, in step ST61, the vehicle speed specifier 64 acquires a road sign recognition result from the road sign recognizer 62, and proceeds to step ST62.

In step ST62, the vehicle speed specifier 64 acquires the regulation speed stipulated for the road on which the vehicle is traveling from the recognition result from the road sign recognizer 62 acquired in step ST61, and proceeds to step ST63.

In step ST63, the vehicle speed specifier 64 determines whether or not the regulation speed acquired in step ST62 has been updated since the previous control cycle. If the determination result in step ST63 is YES, the vehicle speed specifier 64 proceeds to step ST64, sets the value of the pending-approval flag to "1", and proceeds to step ST65. If the determination result in step ST63 is NO, the vehicle speed specifier 64 proceeds to step ST65 while maintaining the value of the pending-approval flag at the value in the previous control cycle. The pending-approval flag is a flag that explicitly indicates that the vehicle speed specifier 64 is currently in a pending-approval state, that is, a state of waiting for approval from the rider regarding a change in the set vehicle speed based on the recognition result. Accordingly, the vehicle speed specifier 64 sets the value of the pending-approval flag to "1" every time the regulation speed is updated (see step ST64), and resets the value of the pending-approval flag to "0" every time an approval operation or a denial operation described later is detected (see step ST71 described later).

In step ST65, the vehicle speed specifier 64 determines whether or not the current set vehicle speed is equal to the regulation speed acquired in step ST62. If the determination result in step ST65 is YES, the vehicle speed specifier 64 ends the process illustrated in FIG. 5. Also, if the determination result in step ST65 is NO, that is, if the current set vehicle speed is different from the regulation speed, the vehicle speed specifier 64 proceeds to step ST66.

In step ST66, the vehicle speed specifier 64 determines whether or not the value of the pending-approval flag is "0". If the determination result in step ST66 is YES, that is, if the pending-approval state is not in effect, the vehicle speed specifier 64 ends the process illustrated in FIG. 5. If the determination result in step ST66 is NO, that is, if the pending-approval state is in effect, the vehicle speed specifier 64 proceeds to step ST67.

In step ST67, the vehicle speed specifier 64 transmits a pending-approval image display command to the display controller 65, and proceeds to step ST68.

Figure 6:
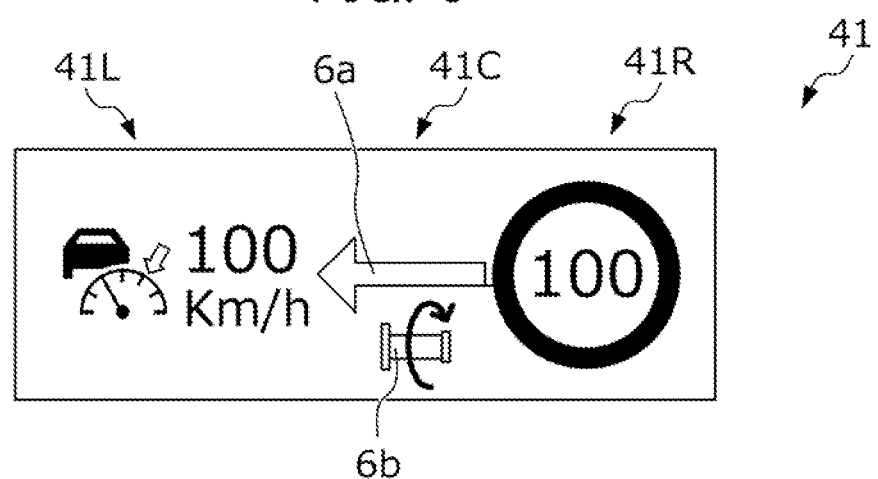
FIG. 6 is a diagram illustrating an example of an image displayed on a display on the basis of a pending-approval image display command.

FIG. 6 is a diagram illustrating an example of an image displayed on the display 41 on the basis of the pending-approval image display command in step ST67. Note that the example in FIG. 6 illustrates a case in which the current set vehicle speed is 100 [km/h] and the road sign recognizer 62 has recognized a regulation sign indicating that a top speed of 80 [km/h] is allowed on the road on which the vehicle is traveling. As illustrated in FIG. 6, if the pending-approval image display command is received from the vehicle speed specifier 64, the display controller 65 displays information related to the ACC function (see the left area 41L) and information related to the TSR function (right area 41R), together with the pending-approval image in the center area 41C.

As described in the following, if the current set vehicle speed and the regulation speed differ, the rider is able to change the set vehicle speed to match the regulation speed with an approval operation of the accelerator grip. The pending-approval image indicated on the display 41 on the basis of the pending-approval image display command suggests that the vehicle is in a state in which the set vehicle speed can be changed to match the regulation speed with an operation of the accelerator grip. Accordingly, the pending-approval image includes an image 6a of an arrow pointing from the top speed recognized by the TSR function to the set vehicle speed (an image suggesting that the set vehicle speed can be changed to match the regulation speed) and an image 6b prompting the rider to operate the accelerator grip.

Returning to FIG. 5, in step ST68, the vehicle speed specifier 64 determines whether or not a turning operation in a predetermined approval pattern (hereinafter also referred to as the "approval operation") with respect to the accelerator grip is detected on the basis of a detection signal from the accelerator position sensor 812. More specifically, the approval operation refers to an operation in which an open/close operation of turning the accelerator grip from the fully closed position in the opening direction and then in the closing direction is performed a predetermined first set number of times within the set time period determined in step ST36 of FIG. 4. Note that the present embodiment describes a case in which the first set number of times is set to "1", but the present invention is not limited thereto. The first set number of times may also be "2" or more.

If the determination result in step ST68 is YES, the vehicle speed specifier 64 proceeds to step ST70. In step ST70, the vehicle speed specifier 64 changes the set vehicle speed on the basis of the recognition result acquired in step ST61, and proceeds to step ST71. More specifically, the vehicle speed specifier 64 changes the set vehicle speed to a value equal to the regulation speed acquired in step ST62.

If the determination result in step ST68 is NO, the vehicle speed specifier 64 proceeds to step ST69. In step ST69, the vehicle speed specifier 64 determines whether or not a turning operation in a predetermined denial pattern (hereinafter also referred to as the "denial operation") with respect to the accelerator grip is detected on the basis of a detection signal from the accelerator position sensor 812. More specifically, the denial operation refers to an operation in which an open/close operation of the accelerator grip is performed a predetermined second set number of times greater than the first set number of times within the set time period determined in step ST36 of FIG. 4. Note that the present embodiment describes a case in which the second set number of times is set to "2", but the present invention is not limited thereto. The second set number of times may simply be greater than the first set number of times, and thus may also be "3" or more.

If the determination result in step ST69 is YES, the vehicle speed specifier 64 skips step ST70 above and proceeds to step ST71. That is, if the denial operation is detected, the vehicle speed specifier 64 maintains the set vehicle speed. In other words, if the denial operation is detected, the vehicle speed specifier 64 does not change the set vehicle speed on the basis of the recognition result acquired in step ST61.

If the determination result in step ST69 is NO, that is, if neither the approval operation nor the denial operation is detected, the vehicle speed specifier 64 maintains the set vehicle speed and ends the process illustrated in FIG. 5.

In step ST71, the vehicle speed specifier 64 sets the value of the pending-approval flag to "0" in response to the detection of the approval operation or the denial operation, and proceeds to step ST72. In step ST72, the vehicle speed specifier 64 transmits a pending-approval image clear command to the display controller 65, and ends the process illustrated in FIG. 5. The display controller 65, upon receiving the pending-approval image clear command, clears the pending-approval image on the display 41. Consequently, after the approval operation or the denial operation by the rider is detected, the pending-approval image is not displayed on the display 41 until the regulation speed is updated thereafter.

Next, specific examples of the set vehicle speed changing process in the TSR linked mode as above will be described with reference to the time charts illustrated in FIGS. 7 to 9.

Figure 7:
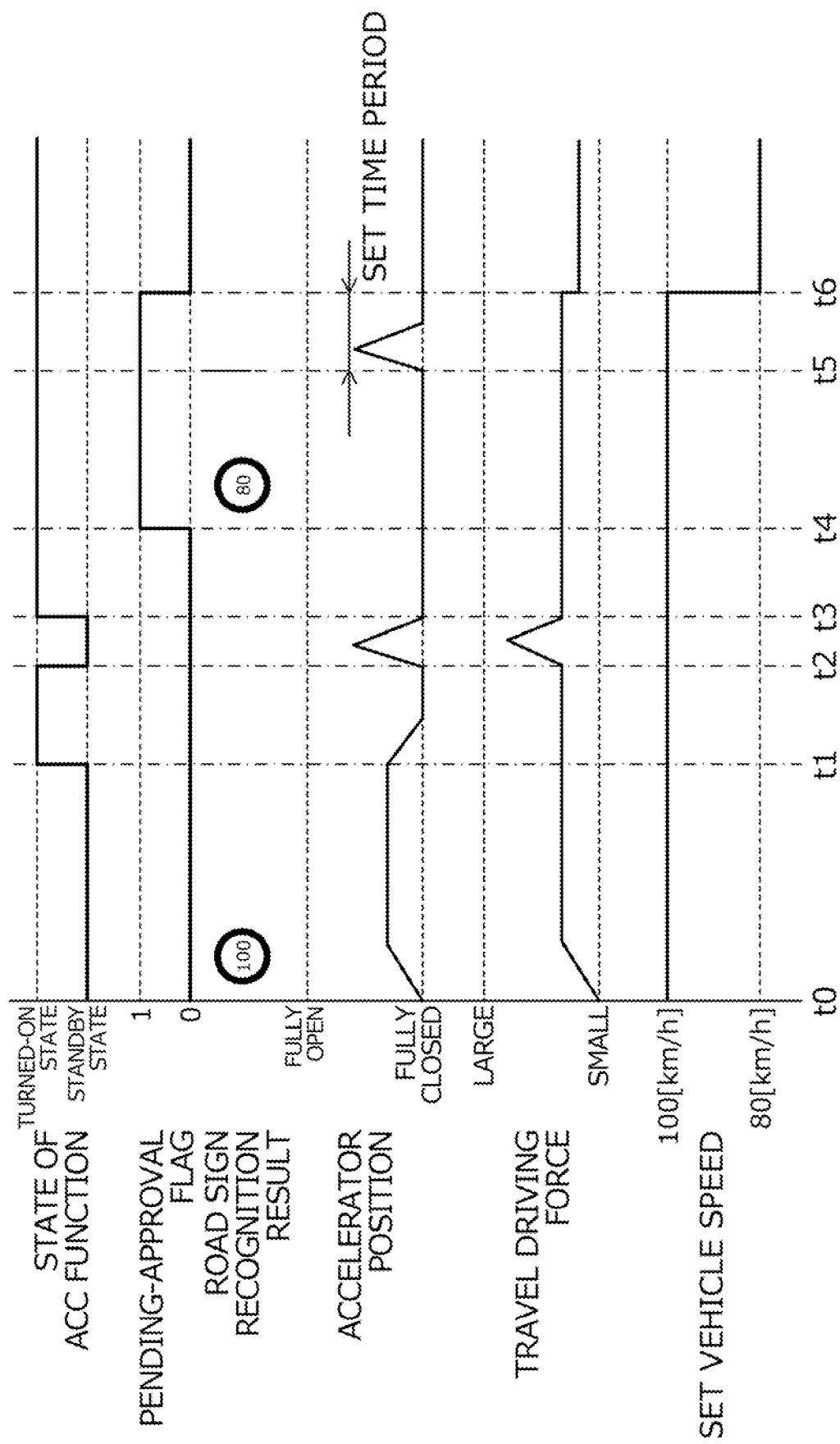
FIG. 7 is a time chart for the case in the pending-approval state in which the rider performs an approval operation.

FIG. 7 is a time chart for the case in the pending-approval state in which the rider performs the approval operation. FIG. 8 is a time chart for the case in the pending-approval state in which the rider performs the denial operation. FIG. 9 is a time chart for the case in the pending-approval state in which the rider performs neither the approval operation nor the denial operation. In each of FIGS. 7 to 9, the state of the ACC function, the value of the pending-approval flag, the road sign recognition result from the road sign recognizer 62, the accelerator position, the travel driving force, and the set vehicle speed are illustrated in the above order from the top of the chart.

The example illustrated in FIG. 7 shows the case in which the automated cruise controller 61 causes the ACC function to go from the standby state to the turned-on state at the time t1 and initiates the automated speed control based on the set vehicle speed. Also, in this case, the road sign recognizer 62 recognizes a regulation sign stipulating a top speed of 100 [km/h] during the period from the time t0 to the time t4, and recognizes a regulation sign stipulating a top speed of 80 [km/h] from the time t4. Also, in this case, the vehicle speed specifier 64 has set the set vehicle speed to 100 [km/h] at the time to.

First, the time chart in FIG. 7 will be described. As illustrated in FIG. 7, in the period from the time t0 to t1 while the ACC function is in the standby state, a travel driving force is generated in accordance with the operation of the accelerator grip by the rider. Also, at the time t1, the automated cruise controller 61 initiates the automated speed control for maintaining the vehicle speed at the set vehicle speed (100 [km/h]). Accordingly, even if the rider returns the accelerator grip to the fully closed position from the time t1, the travel driving force necessary to maintain the vehicle speed at the set vehicle speed is generated. In addition, the rider performs an open/close operation of the accelerator grip during the period from the time t2 to t3. As illustrated in step ST35 of FIG. 4, if an accelerator-on operation is performed on the accelerator grip when the ACC function is in the turned-on state, the ACC function temporarily goes to the standby state. For this reason, as illustrated in FIG. 7, in the period from the time t2 to t3, a travel driving force is generated in accordance with the open/close operation of the accelerator grip.

Thereafter, at the time t4, the top speed of the regulation sign recognized by the road sign recognizer 62 changes from 100 [km/h] to 80 [km/h]. Accordingly, at the time t4, the vehicle speed specifier 64 sets the value of the pending-approval flag from "0" to "1". The set vehicle speed at the time t4 is 100 [km/h], which is different from the regulation speed recognized by the road sign recognizer 62 at that time. Consequently, from the time t4, the vehicle speed specifier 64 enters a state of waiting for approval from the rider regarding a change in the set vehicle speed based on the recognition result from the road sign recognizer 62 (see step ST64 in FIG. 5). Also, with this arrangement, from the time t4, a pending-approval image like the one illustrated in FIG. 6 is displayed on the display 41.

Thereafter, the rider performs the open/close operation of the accelerator grip one time in the period from the time t5 to the time t6 at which the set time period elapses. That is, the vehicle speed specifier 64 detects that the approval operation is performed in the period from the time t5 to t6 (see step ST68 in FIG. 5). Note that, as indicated in steps ST34 to ST36 in FIG. 4, the automated cruise controller 61 continues the automated cruise control as long as an accelerator-on operation is not performed for the set time period or longer in the pending-approval state. Therefore, there is no change in the travel driving force due to the approval operation of the accelerator grip in the period from the time t5 to t6. Also, as illustrated in FIG. 7, the vehicle speed specifier 64, in response to the detection of the approval operation at the time t6, changes the set vehicle speed from 100 [km/h] to 80 [km/h] (see step ST70 in FIG. 5), resets the value of the pending-approval flag to "0" (see step ST71 in FIG. 5), and clears the pending-approval image (see step ST72 in FIG. 5).

Next, the time chart in FIG. 8 will be described. Note that the events occurring in the period from the time t10 to t15 on the time chart illustrated in FIG. 8 are the same as the events occurring in the period from the time t1 to t5 on the time chart illustrated in FIG. 7 described above, and therefore a detailed description is omitted.

Figure 8:
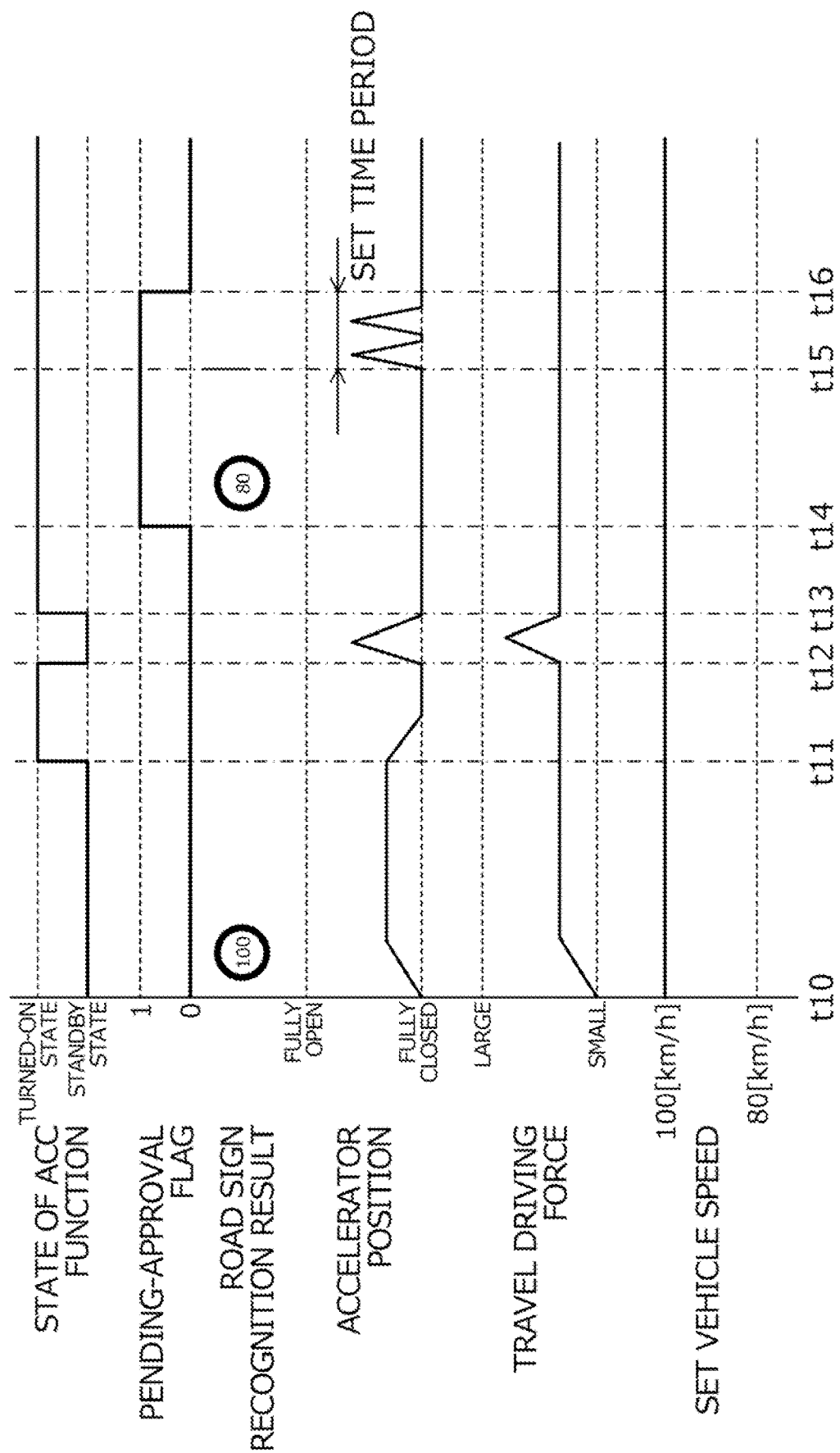
FIG. 8 is a time chart for the case in the pending-approval state in which the rider performs a denial operation.

In the example illustrated in FIG. 8, the rider performs the open/close operation of the accelerator grip two times in the period from the time t15 to the time t16 at which the set time period elapses. That is, the vehicle speed specifier 64 detects that the denial operation is performed in the period from the time t15 to t16 (see step ST69 in FIG. 5). Note that in the period from the time t15 to t16, there is no change in the travel driving force, for the same reasons as in the example illustrated in FIG. 7. Also, as illustrated in FIG. 8, the vehicle speed specifier 64, in response to the detection of the denial operation at the time t16, maintains the set vehicle speed at 100 [km/h], resets the value of the pending-approval flag to "0" (see step ST71 in FIG. 5), and clears the pending-approval image (see step ST72 in FIG. 5).

Next, the time chart in FIG. 9 will be described. Note that the events occurring in the period from the time t20 to t25 on the time chart illustrated in FIG. 9 are the same as the events occurring in the period from the time t1 to t5 on the time chart illustrated in FIG. 7 described above, and therefore a detailed description is omitted.

Figure 9:
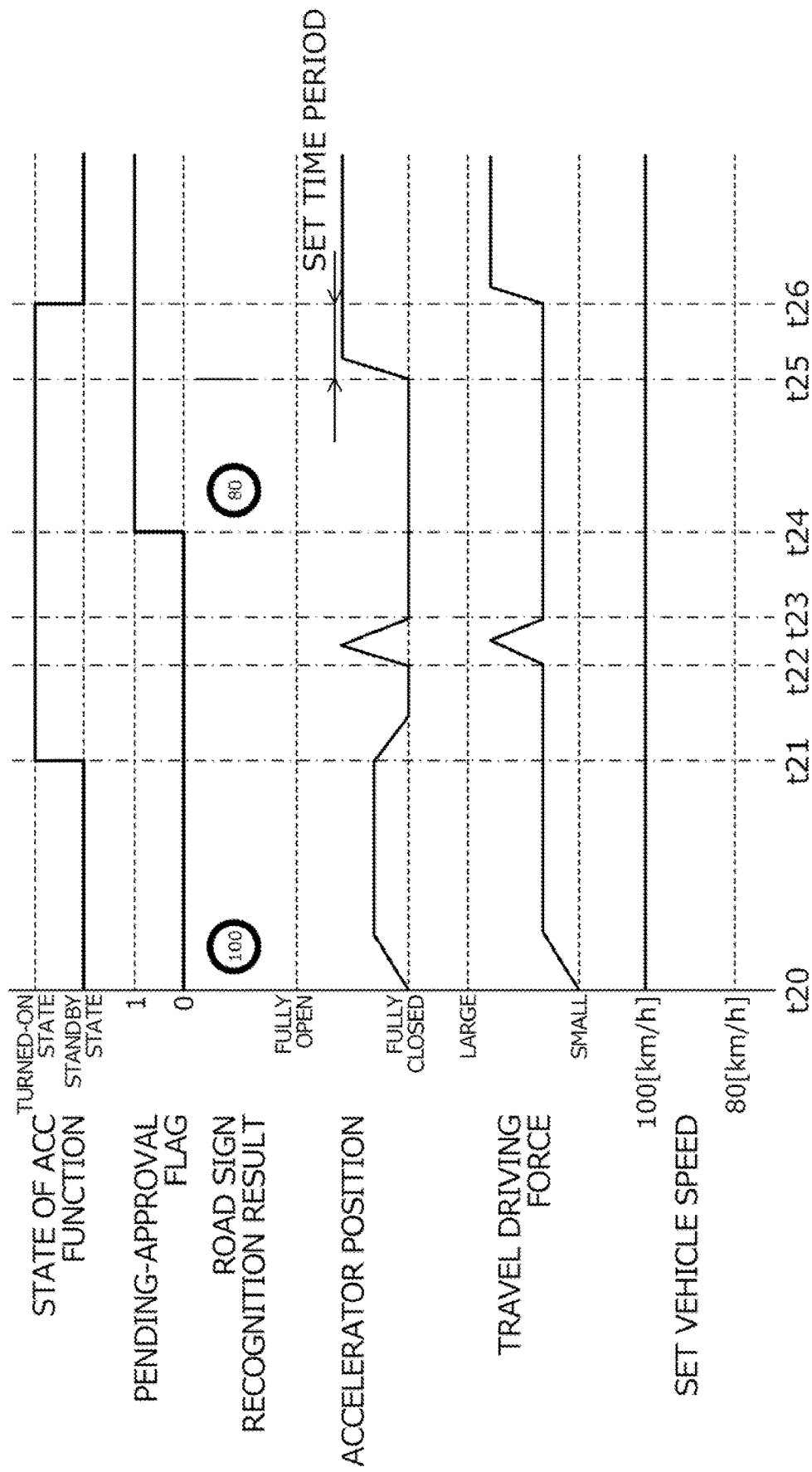
FIG. 9 is a time chart for the case in the pending-approval state in which the rider performs neither an approval operation nor a denial operation.

In the example illustrated in FIG. 9, the rider keeps performing the accelerator-on operation from the time t25. Accordingly, at the time t26 after the set time period from the time t25, the automated cruise controller 61 determines that the accelerator-on operation has been detected for the set time period or longer (see step ST36 in FIG. 4), and temporarily puts the ACC function into the standby state. Thus, from the time t26, the travel driving force increases. Note that since neither the approval operation nor the denial operation is detected from the time t24, the vehicle speed specifier 64 maintains the value of the pending-approval flag at "1" and continues the pending-approval state.

The driver assistance system 1 according to the present embodiment exhibits the following effects.

(1) The driver assistance system 1 is provided with the accelerator grip 811 turnably operable by the rider, the accelerator position sensor 812 that detects a turning operation of the accelerator grip 811, the automated cruise controller 61 that automatically controls the vehicle speed or the following distance on the basis of the set vehicle speed, and the road sign recognizer 62 that recognizes the regulation speed stipulated for the road on which the vehicle is traveling. Thus, according to the driver assistance system 1, while the automated cruise controller 61 is executing the automated cruise control based on the set vehicle speed, it is necessary for the rider to simply grip the accelerator grip 811 with his/her hand, which is convenient because the rider does not need to turn and maintain the accelerator grip 811 at a certain accelerator position. In response to the accelerator position sensor 812 detecting a turning operation in a predetermined pattern while the automated cruise controller 61 is executing the automated cruise control based on the set vehicle speed, that is, while it is unnecessary for the rider to actively perform a turning operation on the accelerator grip 811 as described above, the vehicle speed specifier 64 changes the set vehicle speed on the basis of a recognition result from the road sign recognizer 62. In this way, in the driver assistance system 1, the accelerator grip 811, which does need to be actively operated while the automated cruise control is in progress, is utilized as a control element when the rider approves a change in the set vehicle speed based on a recognition result from the road sign recognizer 62, thereby eliminating the need to provide a new switch. Further, according to the driver assistance system 1, the rider can easily approve a change in the set vehicle speed while the automated cruise control is in progress by simply performing a turning operation in a predetermined pattern while continuing gripping the accelerator grip 811. Thus, according to the driver assistance system 1, the rider at driving does not need to let go of the accelerator grip 811 or check the position of a switch near his/her hand, and therefore the burden imposed on the rider can be lessened, resulting in improvement of traffic safety.

(2) If a turning operation in a predetermined approval pattern is detected by the accelerator position sensor 812, the vehicle speed specifier 64 changes the set vehicle speed on the basis of the recognition result, and if a turning operation in a predetermined denial pattern is detected by the accelerator position sensor 812, the vehicle speed specifier 64 maintains the set vehicle speed without a change on the basis of the recognition result. Thus, according to the driver assistance system 1, while the automated cruise control is in progress, the rider can approve or deny a change in the set vehicle speed based on the recognition result by simply performing a turning operation in the approval pattern or the denial pattern while continuing gripping the accelerator grip 811.

(3) The rider can approve or deny a change in the set vehicle speed while the automated cruise control is in progress by simply performing an open/close operation of the accelerator grip 811 within a preset time period. In many saddle-type vehicles, there is a delay between when the accelerator grip 811 is turned and when the vehicle actually begins to accelerate. For this reason, in many cases, a rider with the intention of accelerating the vehicle keeps the accelerator grip 811 turned to the open side for a certain time period or longer. Thus, according to the driver assistance system 1, it is possible to differentiate an operation of the accelerator grip 811 according to an acceleration intention by the rider, an operation of the accelerator grip 811 according to an approval intention by the rider, and an operation of the accelerator grip 811 according to a denial intention by the rider.

(4) In the driver assistance system 1, if the accelerator position sensor 812 detects an operation of keeping the position of the accelerator grip 811 turned to the open side for a set time period or longer while the automated cruise control is in progress, the automated cruise controller 61 stops executing the automated cruise control and allows the vehicle speed increase to exceed the set vehicle speed. Thus, if the rider attempts to accelerate the vehicle beyond the set vehicle speed for some reason while the automated cruise control based on the set vehicle speed is in progress, the rider may simply keep the accelerator grip 811 turned to the open side for the set time period or longer, which is highly convenient.

(5) The vehicle speed specifier 64 maintains the set vehicle speed if neither the turning operation in the approval pattern nor the turning operation in the denial pattern is detected by the accelerator position sensor 812. With this feature, a change in the set vehicle speed unintended by the rider and an abrupt change in the vehicle speed can be prevented.

(6) In the driver assistance system 1, if a followable target vehicle determined on the basis of the set vehicle speed is recognized successfully, the automated cruise controller 61 automatically controls the following distance with respect to the followable target vehicle to cause the vehicle to follow the followable target vehicle, and if a followable target vehicle is not recognized successfully, the automated cruise controller 61 automatically controls and adjust the vehicle speed to the set vehicle speed. According to the driver assistance system 1, the set vehicle speed for the function for automatically following a followable target vehicle determined on the basis of the set vehicle speed and the function for maintaining the vehicle speed at the set vehicle speed can be changed on the basis of a turning operation of the accelerator grip 811, which is highly convenient.

(7) The driver assistance system 1 is further provided with the display 41 that displays the set vehicle speed and the regulation speed. Thus, according to the driver assistance system 1, the rider can easily recognize the degree of divergence between the set vehicle speed and the regulation speed, and thus can easily judge whether a change of the set vehicle speed based on a recognition result should be approved.

(8) According to the driver assistance system 1, if the set vehicle speed and the regulation speed differ from each other, the vehicle speed specifier 64 displays, on the display 41, a pending-approval image suggesting that the vehicle is in a state in which the set vehicle speed can be changed to match the regulation speed by way of an operation of the accelerator grip 811. With this feature, the rider can easily grasp that the vehicle is in a state in which the set vehicle speed can be changed by simply operating the accelerator grip 811.

The foregoing describes an embodiment of the present invention, but the present invention is not limited thereto. The particulars of the configuration may be modified as appropriate within the scope of the present invention.

What is claimed is:

1. A driver assistance system comprising:
  an accelerator grip turnably operable by a rider to accelerate or decelerate a vehicle which is a saddle-type vehicle;
  an accelerator sensor that detects a turning operation of the accelerator grip;
  an automated cruise controller that automatically controls a vehicle speed of the vehicle or a following distance on a basis of a set vehicle speed;
  a regulation speed recognizer that recognizes a regulation speed stipulated for a road on which the vehicle is traveling; and
  a vehicle speed specifier that, in response to the accelerator sensor detecting an open/close operation of turning the accelerator grip in an opening direction and then in a closing direction while the automated cruise control based on the set vehicle speed is in progress, changes the set vehicle speed on a basis of a recognition result from the regulation speed recognizer, wherein
  the vehicle speed specifier changes the set vehicle speed on a basis of the recognition result in a case where a turning operation in a predetermined approval pattern is detected by the accelerator sensor,
  the vehicle speed specifier maintains the set vehicle speed in a case where a turning operation in a predetermined denial pattern is detected by the accelerator sensor,
  the turning operation in the approval pattern is the open/close operation that is performed a first set number of times within a set time period, and the turning operation in the denial pattern is the open/close operation that is performed a second set number of times within the set time period, the second set number of times being greater than the first set number of times.

2. The driver assistance system according to claim 1, wherein in a case where the accelerator sensor detects an operation of keeping a position of the accelerator grip turned to an open side for the set time period or longer while the automated cruise control is in progress, the automated cruise controller stops executing the automated cruise control and allows the vehicle speed of the vehicle to increase to exceed the set vehicle speed.

3. The driver assistance system according to claim 1, wherein the vehicle speed specifier maintains the set vehicle speed in a case where neither the turning operation in the approval pattern nor the turning operation in the denial pattern is detected by the accelerator sensor.

4. The driver assistance system according to claim 1, further comprising:
   a forward information acquirer that acquires forward information about a state ahead of the vehicle, wherein
   in a case where a followable target vehicle, namely a vehicle ahead that meets a followable target condition determined on a basis of the set vehicle speed, is recognized successfully on a basis of the forward information, the automated cruise controller automatically controls the following distance with respect to the followable target vehicle to cause the vehicle to follow the followable target vehicle, and
   in a case where the followable target vehicle is not recognized successfully on the basis of the forward information, the automated cruise automatically controller controls and adjusts the vehicle speed to the set vehicle speed.

5. The driver assistance system according to claim 1, further comprising:
   a display which is provided at a position visible to the rider at driving and which displays the set vehicle speed and the regulation speed.

6. The driver assistance system according to claim 5, wherein in a case where the set vehicle speed and the regulation speed differ from each other, the vehicle speed specifier displays, on the display, a pending-approval image suggesting that the vehicle is in a state in which the set vehicle speed can be changed to match the regulation speed by way of an operation of the accelerator grip.

\* \* \* \* \*